United States Patent
Bresch-Pietri et al.

(10) Patent No.: US 9,488,118 B2
(45) Date of Patent: Nov. 8, 2016

(54) METHOD OF CONTROLLING A COMBUSTION ENGINE FROM ESTIMATION OF THE BURNT GAS MASS FRACTION IN THE INTAKE MANIFOLD

(71) Applicant: IFP Energies nouvelles, Rueil-Malmaison (FR)

(72) Inventors: Delphine Bresch-Pietri, Vincennes (FR); Thomas Leroy, Saint Germain en Laye (FR); Jonathan Chauvin, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 498 days.

(21) Appl. No.: 13/644,581

(22) Filed: Oct. 4, 2012

(65) Prior Publication Data

US 2013/0096807 A1    Apr. 18, 2013

(30) Foreign Application Priority Data

Oct. 12, 2011   (FR) ...................................... 11 03113

(51) Int. Cl.
F02D 41/00    (2006.01)
F02D 41/18    (2006.01)
F02D 41/14    (2006.01)

(52) U.S. Cl.
CPC ....... F02D 41/0072 (2013.01); F02D 41/0007 (2013.01); F02D 41/18 (2013.01); F02D 2041/0075 (2013.01); F02D 2041/1433 (2013.01); Y02T 10/47 (2013.01)

(58) Field of Classification Search
CPC ............... F02D 41/18; F02D 41/0072; F02D 41/0007; F02D 2041/0075; F02D 2041/1433; G01F 5/00; G05D 11/00; G06F 7/00; G01P 5/00; Y02T 10/47
USPC ........................ 701/108, 103, 101, 102, 29.4; 123/559.1, 559.2, 568.11, 568.12, 123/406.48, 568.21; 60/278, 280, 298, 60/605.1, 605.2

See application file for complete search history.

(56) References Cited

U.S. PATENT DOCUMENTS 5,190,017 A * 3/1993 Cullen et al. .................. 123/676
5,361,745 A * 11/1994 Suzuki et al. ................. 123/435
(Continued)

FOREIGN PATENT DOCUMENTS

DE     103 25 847 A1   3/2004
EP     2 169 205 A2    3/2010
(Continued)

OTHER PUBLICATIONS

Carl R. Nave, Department of Physics and Astronomy at Georgia State University, Poiseuille's Law Calculation, Oct. 12, 2000, http://hyperphysics.phy-astr.gsu.edu/hbase/ppois.html#poi.*

(Continued)

*Primary Examiner* — Stephen K Cronin
*Assistant Examiner* — Susan E Scharpf
(74) *Attorney, Agent, or Firm* — Fitch, Even, Tabin & Flannery LLP

(57) ABSTRACT

In a method of controlling the combustion of a combustion engine from an estimation of the burnt gas mass fraction in the intake manifold, a measurement relative to a fresh air flow rate or to a burnt gas flow rate is performed upstream from the mixing space where fresh air and burnt gas mix. The burnt gas mass fraction present in the mixing space is then estimated from the measurement and from a model of the mixing dynamics in this space. A transport delay between the space and the intake manifold is estimated. The mass fraction of burnt gas in the intake manifold is then deduced in real time. Finally, combustion is controlled from the burnt gas mass fraction in the intake manifold.

15 Claims, 2 Drawing Sheets

(56) References Cited

U.S. PATENT DOCUMENTS

| | | | |
|---|---|---|---|
| 5,758,309 A * | 5/1998 | Satoh | 701/108 |
| 6,098,602 A * | 8/2000 | Martin et al. | 123/568.23 |
| 6,729,301 B2 * | 5/2004 | Nakamori et al. | 123/406.48 |
| 6,742,335 B2 * | 6/2004 | Beck et al. | 60/605.2 |
| 7,367,188 B2 * | 5/2008 | Barbe et al. | 60/605.2 |
| 7,380,400 B2 * | 6/2008 | Barbe et al. | 60/605.2 |
| 7,493,762 B2 * | 2/2009 | Barbe et al. | 60/605.2 |
| 8,447,500 B2 * | 5/2013 | Suzuki et al. | 701/105 |
| 2003/0226544 A1 | 12/2003 | Nakamori et al. | |
| 2009/0164105 A1 * | 6/2009 | Ma et al. | 701/108 |
| 2009/0260605 A1 * | 10/2009 | Janssen et al. | 123/568.12 |
| 2009/0313992 A1 * | 12/2009 | Pearson | 60/605.2 |
| 2010/0071674 A1 | 3/2010 | Rabe et al. | |
| 2011/0106407 A1 * | 5/2011 | Dintino et al. | 701/103 |

FOREIGN PATENT DOCUMENTS

| | | |
|---|---|---|
| JP | H09-53519 A | 2/1997 |
| JP | 2004-197618 A | 7/2004 |
| WO | WO 2010/112719 A1 | 10/2010 |

OTHER PUBLICATIONS

Notice of Reasons for Rejection corresponding to Japanese Application No. 2012-227180 dated May 24, 2016.

* cited by examiner

METHOD OF CONTROLLING A COMBUSTION ENGINE FROM ESTIMATION OF THE BURNT GAS MASS FRACTION IN THE INTAKE MANIFOLD

BACKGROUND OF THE INVENTION

1. Field of the Invention

The present invention relates to the sphere of engine control and more particularly to the estimation of the burnt gas recirculation rate for a gasoline engine provided with an EGR circuit.

2. Description of the Prior Art

Downsizing gasoline engines currently appears to be the preferred option for reducing the consumption of gasoline engines. In fact, this technology allows shifting the working points of the engine to zones of higher efficiency and thus to limit the pumping losses inherent in the operation of an internal-combustion engine. This type of engine then requires the presence of a compressor driven by a turbine arranged in the exhaust line. Such a device is used to improve air filling of the cylinder and to provide a torque equivalent to that of an engine of conventional displacement. It is thus possible to have the same performances while drastically reducing the consumption.

However, using such a technology greatly increases the risk of engine knock appearance. When the engine runs under full load conditions, the thermodynamic conditions in the combustion chamber may be detrimental to the stability of the mixture and generate auto-ignition thereof. This phenomenon can eventually greatly deteriorate the combustion chamber.

To solve this problem, the ignition advance is usually degraded. This option generates an increase in the gas temperature at the end of the combustion cycle and therefore over the entire exhaust line. Thus, in order to compensate for this phenomenon, the mixture is richened at the intake.

Such a method involves two drawbacks: first, it increases the engine consumption; furthermore, it deteriorates the efficiency of the catalyst arranged downstream from the exhaust manifold, which provides optimal conversion of the pollutants resulting from the combustion when the mixture is in stoichiometric proportions.

In this context, burnt gas recirculation (EGR) from the exhaust to the intake is a promising option. Indeed, feeding burnt gas that has not reacted during combustion into a cylinder of the engine allows decreasing the overall combustion temperature and to limit engine knock appearance. The advantages of downsizing in terms of efficiency and consumption are thus preserved. Moreover, introduction of burnt gas also allows reduction of the temperature of the exhaust gas and therefore to limit the impact thereof on the catalyst or the turbine.

However, such a strategy has a great influence on the overall running conditions of the engine. For example, the air mass trapped in the cylinder is smaller in an EGR configuration since burnt gas takes the place of fresh air in the cylinder. To operate under stoichiometric conditions, it is necessary to adjust the fuel loop to the air loop, and thus to have a precise estimation of the composition of the gas in the cylinder. Such a reasoning also applies to the strategies for controlling variable valve actuators (VVT type) or to the ignition advance strategy. Moreover, this estimation is essential for torque transient management, notably at low loads where too high a proportion of burnt gas can extinguish the combustion.

The presence of a gas composition estimator in the intake manifold is therefore necessary to allow proper combustion control (ignition advance control, gas composition control for example), in particular in transient states.

SUMMARY OF THE INVENTION

The composition of the mixture at the intake is thus an essential datum. The method according to the invention allows estimation in real time of such a composition, notably the burnt gas mass fraction present in the mixture in the intake manifold, then to control the combustion through control of the ignition advance or of this fraction by use of an EGR valve (6).

In general terms, the invention relates to a method of controlling the combustion of a combustion engine (1) comprising at least one cylinder (2), an intake circuit including an intake manifold (3) and a burnt gas recirculation circuit including an EGR valve (6). The method comprises the following stages:

performing a measurement relative to a gas, fresh air or burnt gas flow rate, upstream from a mixing space $V_{bp}$ wherein fresh air and burnt gas mix, estimating a burnt gas mass fraction $BGR_{bp}$ present in the mixing space, from the measurement and a model of the mixing dynamics in the space, estimating a transport delay from the space to the intake manifold, estimating in real time a burnt gas mass fraction $BGR(t)$ in the intake manifold from the estimation of the burnt gas mass fraction present in the mixing space and the transport delay, controlling the combustion from the burnt gas mass fraction $BGR(t)$ in the intake manifold.

According to the invention, the model of the mixing dynamics in the mixing space can be a function of an atmospheric pressure, of a temperature upstream from the EGR valve, of the space $V_{bp}$, of a mass flow rate $D_{gb}(t)$ of burnt gas fed through the EGR valve and of a fresh air mass flow rate $D_{air}(t)$ at the intake circuit inlet.

According to the invention, the pure delay $\tau$ can be calculated by solving a laminar flow law iteratively over intake circuit zones defined in such a way that thermodynamic conditions in each zone are homogeneous. Three zones can therefore be defined as follows: a first zone where the thermodynamic conditions correspond to the atmospheric conditions; a second zone where pressure and temperature increase during gas transport, and a third zone where the temperature decreases, which is the remaining zone of the intake circuit.

According to one embodiment, the measurement is a measurement of the mass flow rate of fresh air at the intake line inlet. According to another embodiment, the measurement is a measurement of a pressure difference (P at the EGR valve, and the burnt gas mass fraction $BGR_{bp}$ present in the space is estimated from pressure difference (P and from a punctual pressure drop (that is, a pressure drop at a point of the system) relation applied at the EGR valve.

According to an embodiment, combustion control is achieved by controlling an ignition advance, by adding a proportional term to the burnt gas mass fraction $BGR(t)$ in the intake manifold.

According to another embodiment, combustion control is achieved by controlling an air mass contained in the cylinder, by controlling the EGR valve (6) to minimize the difference between $BGR(t)$ and a burnt gas fraction set point in the intake manifold (3) $BGR^{sp}$.

The invention also relates to a combustion engine (1) comprising at least one cylinder (2), an intake manifold (3) and a burnt gas recirculation circuit comprising an EGR valve (6), the combustion engine being provided with a pressure detector (5) at the level of the EGR valve (6) or with an air flow meter (5') at the start of the intake line. The engine comprises a controller for applying the control method according to the invention.

BRIEF DESCRIPTION OF THE DRAWINGS

Other features and advantages of the method according to the invention will be clear from reading the description hereafter of non limitative embodiment examples, with reference to the accompanying figures wherein.

DETAILED DESCRIPTION OF THE INVENTION

Figure 1:
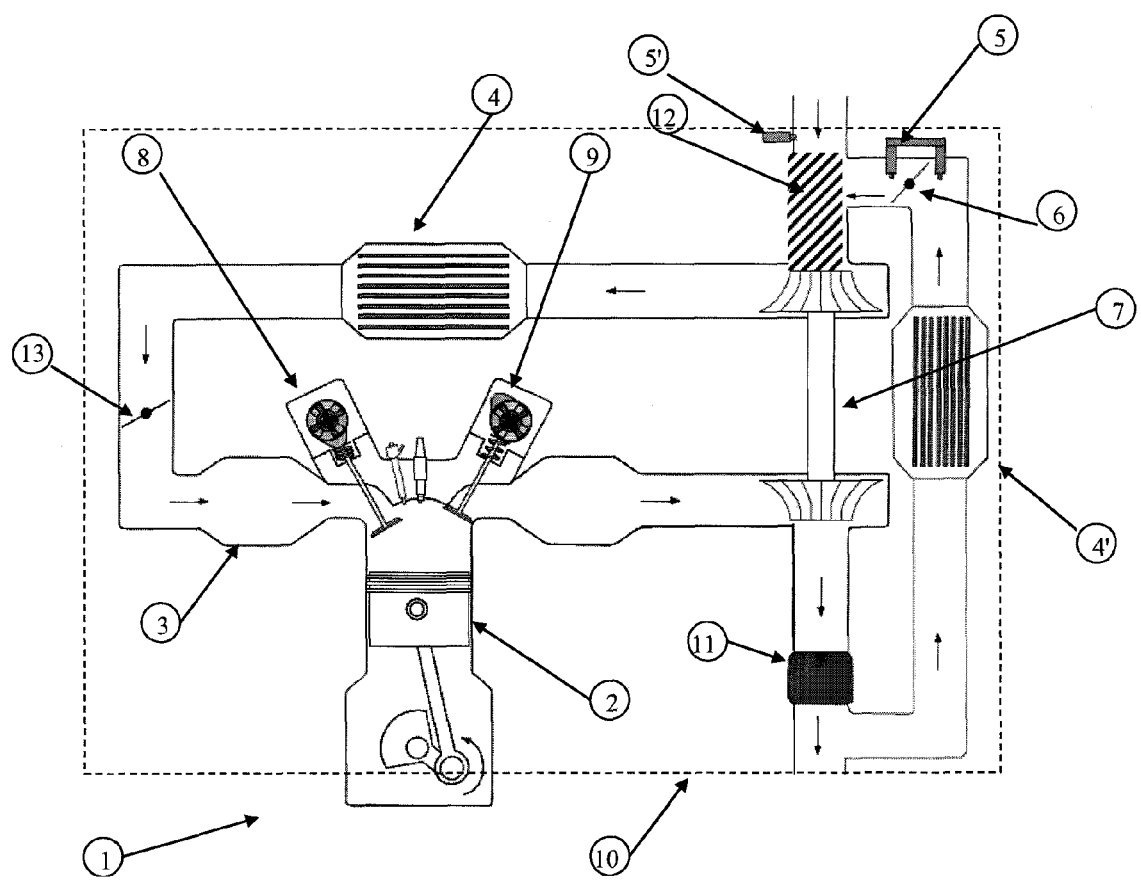
FIG. 1 illustrates a supercharged gasoline engine comprising an EGR circuit.

FIG. 1 shows a gasoline engine (1) provided with an EGR burnt gas recirculation circuit. At least one cylinder (2) of combustion engine (1) is supplied with air and burnt gas from an intake manifold (3). The air intake circuit is provided with a cooler (4) and a turbocharger (7) compressor. The exhaust line HAS an exhaust manifold (13), a turbocharger (7) turbine, and a bypass line, for injecting part of the burnt gas into the air intake circuit. This part of the circuit is notably provided with a cooler (4') and a controlled valve, referred to as EGR valve (6), which controls the amount of burnt gas injected into the air intake circuit. This engine is in particular equipped with either a pressure difference detector (5) EGR valve or an air flow meter (5') at the start of the intake line. Engine (1) as shown in FIG. 1 is also provided with a direct injection device and a variable valve timing system which elements are usually present in a downsized engine (reduced engine displacement) but whose presence is not taken into consideration in the method according to the invention.

The burnt gas recirculation circuit withdraws burnt gas at the engine exhaust downstream from the turbine of turbocharger (7) and catalyst (11), and reinjects it into the intake of a cylinder (2) upstream from the compressor of turbocharger (7). The amount of burnt gas reinjected into the intake line is controlled by controlled EGR valve (6) arranged downstream from the EGR burnt gas recirculation circuit.

Since a gasoline engine runs under optimum conditions when the proportion of air/gasoline mixture allows providing complete combustion of the fuel without excess air, it is generally understood that the exhaust gas fully has only burnt gas. Thus, the EGR burnt gas recirculation circuit is only filled with burnt gas.

Notations

In the description, the terms upstream and downstream are defined with respect to the direction of flow of the fluids in air loop (10). Furthermore, the main notations used are as follows:

t is time x are points in the intake circuit.

Engine Parameters $P_{atm}$ and $T_{atm}$ are atmospheric pressure and temperature. They can be considered to be constant.

$T_{am}$ is the upstream temperature at the EGR valve inlet. This temperature is imposed by the passage through exchanger (4') arranged in the burnt gas recirculation circuit.

$V_{bp}$ is the fresh air and burnt gas mixing space, downstream from the EGR valve. It is the volume occupied by the lines at the intersection of the fresh air delivery lines and the burnt gas delivery lines. This space extends up to the compressor of turbocharger (7). This space corresponds to the hatched zone (12) of FIG. 1.

$V_{adm}$ is the volume of the intake manifold.

$P_{adm}$ and $T_{adm}$ are the pressure and temperature in the intake manifold. Conventionally, the intake temperature is considered to be constant. Indeed, the exchanger arranged upstream from the manifold is so dimensioned as to provide such a regulation.

$\Phi_{adm}$ and $\Phi_{ech}$ are the position of the intake (8) and exhaust (9) valve actuators. These variables quantify a phase difference with respect to a reference position.

$N_e$ is the engine speed.

Variables of the Air Loop Model

BGR is the burnt gas mass fraction in the air mixture (fresh air and burnt gas) at the level of intake manifold (3). It conditions the mass of burnt gas present in the cylinder upon closure of intake valve (8).

$BGR_{bp}$ is the burnt gas mass fraction in the air mixture (fresh air and burnt gas) at the level of the volume downstream from EGR valve (12).

$D_{gb}$ (t) is the mass flow rate of burnt gas fed through EGR valve (6).

$D_{air}$ (t) is the fresh air mass flow rate at the intake line inlet. This quantity can, depending on the instrumentation, be measured by an air flow meter (5').

$D_{asp}$ is the mass flow rate of cylinder filling with air mixture (fresh air and burnt gas).

$D_{thr}$ is the air mixture (fresh air and burnt gas) mass flow rate upstream from the compressor of turbocharger (7).

$\tau$ is the gas transport delay between the time of fresh air and burnt gas mixing, and the delivery in the intake manifold.

S is the effective surface area of the EGR valve. This quantity characterizes the surface area of fluid that can flow through the valve and it is linked with the opening of the valve via a characteristic map of the valve considered.

$P_{am}$ is the upstream pressure at the EGR valve inlet.

$P_{av}$ is the downstream pressure at the EGR valve outlet.

$\Delta P$ is the pressure difference between upstream and downstream from the EGR valve: $\Delta P = P_{am} - P_{av}$. This quantity can, depending on the instrumentation, be measured with instrumentation (5) of the EGR valve.

P and T are the current pressure and temperature, that is, at a point x and at a time t.

v is the punctual velocity (i.e., velocity a point of the system) of the air mixture (fresh air and burnt gas) in the intake circuit.

$L_{cana}$ is the length of the intake circuit line considered.

A is the effective cross section of the intake circuit line considered.

$\rho$ is the density of the gas mixture.

Constants of the Air Loop Model r is the specific ideal gas constant, which is the same for all the gases concerned here (exhaust gas and air), and has the value 288 J/kg/K.

$\gamma$ is the gas specific heat ratio. The gases are assumed to be ideal; this ratio is an identical constant for all the gases concerned; and it has the value 1.4.

These notations, with index --$^{sp}$, represent the set point values associated with the quantities considered.

Figure 3:
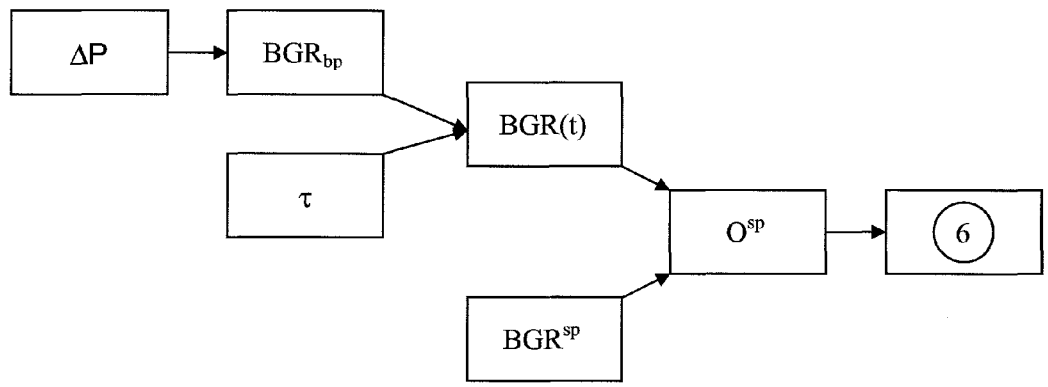
FIG. 3 shows a process flow diagram of the method according to the invention.

The method according to the invention allows estimation of the burnt gas mass fraction present in the mixture at the level of the intake manifold, then controlling this fraction by controlling EGR valve (6) of the exhaust gas recirculation circuit. It is based on the use of either a pressure difference detector at the level of the EGR valve or a flow meter at the start of the intake line. FIG. 3 shows a process flow diagram of the method according to the invention that comprises the following stages:

1. Acquisition of a measurement relative to a gas mass flow rate upstream from the mixing zone in the intake circuit.

2. Real-time estimation of the burnt gas mass fraction present in the mixture at the level of the intake manifold:
 i. Estimation of the burnt gas mass fraction present in the gas mixing space
 ii. Estimation of the transport delay from this space to the intake manifold
 iii. Combustion control from the estimated BGR.

1—Acquisition of a Measurement Relative to the Gas Mass Flow Rate in the Intake Circuit The first stage performs a measurement relative to a gas mass flow rate (fresh air or burnt gas) upstream from the (fresh air and burnt gas) mixing zone in the intake circuit. The mixing space corresponds to a volume downstream from the EGR valve. It is the volume of the lines at the intersection of the fresh air delivery lines and the burnt gas delivery lines and extends up to the compressor of turbocharger (7). This volume corresponds to hatched zone (12) in FIG. 1.

It can be a value relative to the burnt gas flow rate, or a value relative to the fresh air mass flow rate at the intake line inlet.

According to one embodiment, the fresh air mass flow rate at the intake line inlet is measured using an air flow meter (5') arranged at the start of the intake line.

According to another embodiment (FIG. 3), the difference between the pressure downstream from the EGR valve and the pressure upstream from the EGR valve is measured using a pressure difference detector (5) at the level of the EGR valve.

This value is correlated with the phenomenon occurring at the valve, notably at the mixing space, where mixing of fresh air and of burnt gas occurs.

To obtain an estimation of the burnt gas mass fraction at the level (point) of the intake manifold, the burnt gas mass fraction at the level of the mixing space is estimated, from this pressure difference measurement or from the measurement given by the air flow meter, then a delay due to the distance travelled from the mixing space to the intake manifold is applied.

2—Real-Time Estimation of the Burnt Gas Mass Fraction Present in the Mixture at the Level of the Intake Manifold The burnt gas recirculation circuit (EGR circuit) withdraws burnt gas at the exhaust downstream from the turbine and reinjects it into the intake upstream from the compressor. The amount of burnt gas reinjected into the intake line is controlled by a valve arranged at the junction between the intake line and the EGR recirculation circuit which is downstream from the EGR circuit. This actuator (EGR valve) is spatially distant from the intake manifold. A subsequent variable transport delay is induced on the intake line between the burnt gas mass fraction at the level (point) of the mixing space, downstream from the EGR valve, and at the intake manifold. The mixing space is the volume of the lines at the intersection of the fresh air delivery lines and the burnt gas delivery lines. This volume extends up to the compressor of turbocharger (7). This volume corresponds to hatched zone (12) of FIG. 1.

Since a gasoline engine runs under optimum conditions when the proportion of air/gasoline mixture allows complete combustion of the fuel without excess air, it is generally considered that the exhaust gas fully is only burnt gas. The EGR circuit thus is filled only with burnt gas. It is then possible to model the dynamics of the reinjected burnt gas in two stages:

a mixing dynamics in the mixing space:

$$\frac{d}{dt}BGR_{bp}(t) = \frac{rT_{am}}{P_{atm}V_{bp}}(-[D_{gb}(t) + D_{air}(t)]BGR_{bp} + D_{gb}(t)) \quad (E1)$$

a dynamics of transport from this space to the intake manifold, represented by a transport over time:

$$BGR(t)=BGR_{bp}(t-\tau(t)) \quad (E2)$$

Thus, according to the invention, real-time estimation of the burnt gas mass fraction BGR(t) present in the mixture at the level (point) of the intake manifold is achieved by estimating the burnt gas mass fraction present in the mixing space. The transport delay from this space to the intake manifold is then estimated by segmenting the intake line according to the thermodynamic conditions.

i. Estimation of the Burnt Gas Mass Fraction Present in the Mixing Space

In order to provide an estimation of the burnt gas composition in the intake manifold, first estimate the burnt gas composition in the mixing space is estimated. Therefore, Equation 1 is to be solved:

$$\frac{d}{dt}BGR_{bp}(t) = \frac{rT_{am}}{P_{atm}V_{bp}}(-[D_{gb}(t) + D_{air}(t)]BGR_{bp} + D_{gb}(t)).$$

To achieve this, the following parameters are known:
r is the specific ideal gas constant, which is the same for all the gases concerned here (exhaust gas and air), and has the value 288 J/kg/K.
$T_{am}$ is the upstream temperature at the EGR valve inlet. This temperature is imposed by the passage through exchanger (4') in the burnt gas recirculation circuit.
$P_{atm}$ is the atmospheric pressure and can be considered to be a first-order constant.
$V_{bp}$ is the mixing space and is a manufacturer's datum.

And the following parameters have to be estimated to solve Equation (E1):
$D_{air}(t)$ is the fresh air mass flow rate at the intake line inlet.
$D_{gb}(t)$ is the mass flow rate of burnt gas fed through the EGR valve.

To estimate $D_{gb}+D_{air}$, the total mass flow rate of gas (fresh air and burnt gas) leaving the mixing space, $D_{thr}$ can be introduced, the gas (fresh air and burnt gas) mass flow rate upstream from the compressor of turbocharger (7), and write $D_{thr}=D_{gb}+D_{air}$=real total flow rate. This flow rate $D_{thr}$ can be estimated by a model constructed by combining a static cylinder filling model with a dynamic model of the punctual pressure drop occurring at the level (point) of the fresh air butterfly valve (13 in FIG. 1). For example:

$$D_{thr} = D_{asp} + \frac{r}{V_{adm}T_{adm}} \frac{dP_{adm}}{dt} \quad (E6)$$

where $P_{adm}$, $T_{adm}$ and $V_{adm}$ are known, and where $D_{asp}$ is the mass flow rate of cylinder filling with gas (fresh air and burnt gas). A static filling model is considered for estimating the burnt gas mass in the cylinder as a function of the engine speed, the temperature and the pressure in the intake manifold, and the actuator positions.

$$\begin{cases} M_{asp}^{int} = \alpha_1 \frac{P_{adm}}{rT_{ad\grave{u}}} V_{ivc} - M_{asp}^{ech} \\ M_{asp}^{ech} = \alpha_2 \frac{OF}{N_e} + \alpha_3 V_{evc} \end{cases} \quad (E3)$$

with:
$M_{asp}^{int}$ is the burnt gas mass in the cylinder.
$M_{asp}^{ech}$ is the burnt gas mass at the cylinder exhaust.
$\alpha_1$ and $\alpha_2$ and $\alpha_3$ are the known maps, functions of $P_{adm}$ and $N_e$ (experimentally determined on the test bench).
$V_{ivc}$ is the volume of the cylinder upon intake valve closure (ivc). This volume is a function of the position of the intake valve actuator $\Phi_{adm}$, and of the engine dimensions.
$V_{evc}$ is the volume of the cylinder upon exhaust valve closure (evc). This volume is a function of the position of the exhaust valve actuator $\Phi_{ech}$, and of the engine dimensions.
OF is the overlap factor. It is a function of the positions of the intake and exhaust valve actuators $\Phi_{adm}$ and $\Phi_{ech}$. It can be determined by the relation:

$$OF = \int_{\theta_{ivo}}^{\theta_{iv}=\theta_{ev}} A_{int} d\theta + \int_{\theta_{iv}=\theta_{ev}}^{\theta_{evc}} A_{ech} d\theta$$

with:
$A_{adm}$ and $A_{ech}$ are the intake and exhaust valve opening areas which are engine parameters.
$\theta$ is the crank angle.
$\theta_{ivo}$ is the crank angle upon intake valve opening (ivo). This angle is a function of the position of the intake valve actuator $\Phi_{adm}$.
$\theta_{evc}$ is the crank angle upon exhaust valve closure (evc). This angle is a function of the position of the exhaust valve actuator $\Phi_{ech}$.
$\theta_{iv}=\theta_{ev}$ which is the crank angle where both valves have the same opening area.

From this system of equations (E3), the mass of burnt gas in the cylinder from engine parameters $P_{adm}$, $N_e$, $\Phi_{adm}$ and $\Phi_{ech}$ and from overlap factor OF is expressed.

By combining the equations of system (E3), we can define a function g between the burnt gas mass as a function of the three parameters $P_{adm}$, $\Phi_{adm}$ and $\Phi_{ech}$ can be defined which is:

$$M_{asp}^{int} = g(P_{adm}, \Phi_{adm}, \Phi_{ech}) \quad (E3')$$
$$= \alpha_1(P_{adm}, N_e) \frac{P_{adm}}{rT_{adm}} V_{ivc}(\Phi_{adm}) - \alpha_2(P_{adm}, N_e) \frac{OF(\Phi_{ad\grave{u}}, \Phi_{ech})}{N_e} - \alpha_3(P_{adm}, N_e) V_{ech}(\Phi_{ech})$$

The mass flow rate of cylinder filling with air can be determined by relation (E4):

$$D_{asp} = \frac{N_e}{30} M_{asp}^{int} \quad (E4)$$

Equations (E3') and (E4) are then combined and, for the sake of clarity, the engine speed and the intake temperature are disregarded in the expression. Thus a function f between the cylinder filling mass flow rate and the three parameters $P_{adm}$, $\Phi_{adm}$ and $\Phi_{ech}$ (E5) is defined as follows:

$$\begin{aligned} D_{asp} &= \frac{N_e}{30} M_{asp}^{int} \\ &= \frac{N_e}{30} g(P_{adm}, \Phi_{adm}, \Phi_{ech}) \\ &= f(P_{adm}, \Phi_{adm}, \Phi_{ech}) \end{aligned} \quad (E5)$$

The mass flow rate of the air mixture (fresh air and burnt gas) upstream from the compressor of turbocharger (7) can be determined therefrom using a relation of the type as follows:

$$D_{thr} = D_{asp} + \frac{r}{V_{adm}T_{adm}} \frac{dP_{adm}}{dt} \quad (E6)$$

To estimate $D_{gb}(t)$, the burnt gas mass flow introduced through the EGR valve, the measurement of the difference between the pressure downstream from the EGR valve and the pressure upstream from the EGR valve (stage 1) can be used if the engine is provided with a dedicated detector:

$$D_{gb} = \phi(\Delta P) \quad (E7)$$

A punctual load (that is, load at a point of the system) relation is applied at a point of the EGR valve, for example the Barré-Saint Venant relation. A relation is written between the mass flow rate of burnt gas fed through the EGR valve, $D_{gb}$, the effective surface area S of the EGR valve, the temperature upstream from the valve, $T_{am}$, and the pressure difference at a point of the valve (Equation 11):

$$D_{gb} = \frac{SP_{am}}{\sqrt{rT_{am}}} \begin{cases} \left(\frac{P_{av}}{P_{am}}\right)^{\frac{1}{\gamma}} \sqrt{\frac{2\gamma}{\gamma-1}\left(1-\left(\frac{P_{av}}{P_{am}}\right)^{\frac{\gamma-1}{\gamma}}\right)} & \text{if } \frac{P_{av}}{P_{am}} > \left(\frac{2}{\gamma+1}\right)^{\frac{\gamma}{\gamma-1}} \\ \sqrt{\gamma\left(\frac{2}{\gamma+1}\right)^{\frac{\gamma+1}{\gamma-1}}} & \text{otherwise} \end{cases}$$

This relation is obtained by applying the Barré-Saint Venant relation for a fluid flowing from a point 1 (upstream) to a point x (downstream), which allows determining the velocity V of the fluid at point x:

$$V(x) = \sqrt{\frac{2\gamma}{\gamma-1} rT_1\left(1-\frac{P(x)}{P_1}\right)^{\frac{\gamma}{\gamma-1}}}$$

which $P_1$ being the pressure at point 1.
Then the velocity is related to the mass flow rate by the relation:

$$V(x) = \frac{D_{gb}}{\rho S}$$

The formula as follows is then applied to obtain Equation 11:

$$\rho = \frac{P_1}{rT}$$

The pressure downstream from the valve is considered to be the atmospheric pressure, and the relation below can therefore be expressed only by a quantity $\Delta P = P_{am} - P_{av}$ and $P_{atm}$. In an advantageous embodiment of the invention, this model can be linearized for the small values of $\Delta P$ (for example for $\Delta P < 10\% \; P_{atm}$).

Alternatively, to estimate $D_{gb}(t)$, the burnt gas mass flow introduced through the EGR valve, it is possible to use an air flow meter (5') that measures the fresh air mass flow rate at the intake line inlet, ($D_{air}$) and then to use the flow rate model given in ((E3)-(E6)) to estimate the burnt gas flow rate, by writing $D_{gb} = D_{thr} - D_{air}$.

Using model ((E6) and (E5)) in the mixing dynamics (E1) in place of the real total flow rate $D_{thr} = D_{gb} + D_{air}$ = real total flow rate, an estimation is constructed of the amount of burnt gas present in the mixing space, written as:

$$\frac{d}{dt} BGR_{bp}(t) = \frac{rT_{am}}{P_{atm}V_{bp}}(-D_{thr}BGR_{bp} + D_{gb}(t))$$

with $$D_{thr} = g\left(D_{asp}, \frac{dP_{adm}}{dt}\right) \text{ and}$$

$$D_{asp} = f(P_{adm}, \Phi_{adm}, \Phi_{ech}) \text{ and}$$

$$D_{gb} = \varphi(\Delta P)$$

or written as:

$$\frac{d}{dt} BGR_{bp}(t) = \frac{rT_{am}}{P_{atm}V_{bp}}(-D_{thr}BGR_{bp} + [D_{thr} - D_{air}(t)])$$

with $$D_{thr} = g\left(D_{asp}, \frac{dP_{adm}}{dt}\right) \text{ and}$$

$$D_{asp} = f(P_{adm}, \Phi_{adm}, \Phi_{ech})$$

according to the engine instrumentation.

Thus, the burnt gas mass fraction $BGR_{bp}$ present in the mixing space is estimated. Estimation of $D_{thr}$ is achieved from known parameters, and estimation of $D_{gb}(t)$ is achieved either of the measurement of the difference between the pressure downstream from the EGR valve and the pressure upstream from the EGR valve (stage 1) and of the application of a relation of a load at the level (point) of the EGR valve, the Barré-Saint Venant relation for example, or by the measurement performed by an air flow meter (stage 1) and of a mass balance using estimation $D_{thr}$.

The estimation obtained by this methodology can be initialized (or calibrated) when the EGR valve is closed and the proportion of burnt gas downstream from the valve is zero.

ii. Estimation of the Transport Delay from this Space to the Intake Manifold

In order to obtain an estimation of the burnt gas mass fraction at the level (point) of the intake manifold, from the burnt gas mass fraction at the level (point) of the mixing space, a pure delay due to the distance travelled from the mixing space to the intake manifold is applied to the estimator of $BGR_{bp}$.

This gas transport delay between the time of fresh air and burnt gas mixing, and the delivery in the intake manifold is denoted by $\tau$. This delay is a function of the distance travelled and of the velocity of the air mixture. The length of the line is denoted by $L_{cana}$ and the velocity of the air mixture by $v$. The effective cross section of the line considered, in which the mixture circulates, is denoted by A. Finally, D represents the current mass flow rate.

Pure delay $\tau$ can be defined implicitly from a laminar flow law:

$$L_{cana} = \int_{-\tau(t)} v(s) ds \quad (E7)$$

$$v(s) = \frac{D(s)rT(s)}{AP(s)} \quad (E8)$$

where the thermodynamic conditions (pressure P and temperature T) are involved in the relation between velocity and mass flow rate (E8) and where s is an integration variable (mute variable).

In order to estimate this pure delay from Equations E7 and E8, the intake line is divided according to the prevailing thermodynamic conditions. The goal is that the thermodynamic conditions within each zone are stable (constant, or varying linearly). This segmentation therefore depends on the engine architecture.

Thus, according to an embodiment, the definitions of the zones with respect to the thermodynamic conditions lead to the segmentation as follows:

The first zone is located between the EGR valve and the compressor of turbocharger (7). The thermodynamic conditions of this zone correspond to the atmospheric conditions.

The second zone extends from the compressor of turbocharger (7) to intercooler (4). The pressure and the temperature in this zone are considered to be homogeneous. They are measured by a dedicated detector, The last zone considered is located between intercooler (4) and air butterfly (13). The cooler is dimensioned to drastically decrease the temperature, and the temperature is considered to be homogeneous and equal to the temperature measured in the manifold. The pressure is also considered to be homogeneous and equal to that of the second zone, upstream from the cooler.

On each one of these segments, the flow relation of (E7)-(E8) type is solved by iteration from the start of the intake line (EGR valve). This solution can be performed by discretization of the integral and direct numerical computation. This relation uses thermodynamic data that are obtained either through direct measurement or via models, according to the technical definition of the engine detectors. Moreover, the value of mass flow rate D is approximated by model (E3).

Once delay $\tau$ determined, relation (E2) is applied to obtain in real time an estimation of the burnt gas mass fraction present in the mixture at the level (point) of the intake manifold:

$$BGR(t) = BGR_{bp}(t - \tau(t)) \quad (E2)$$

Figure 2:
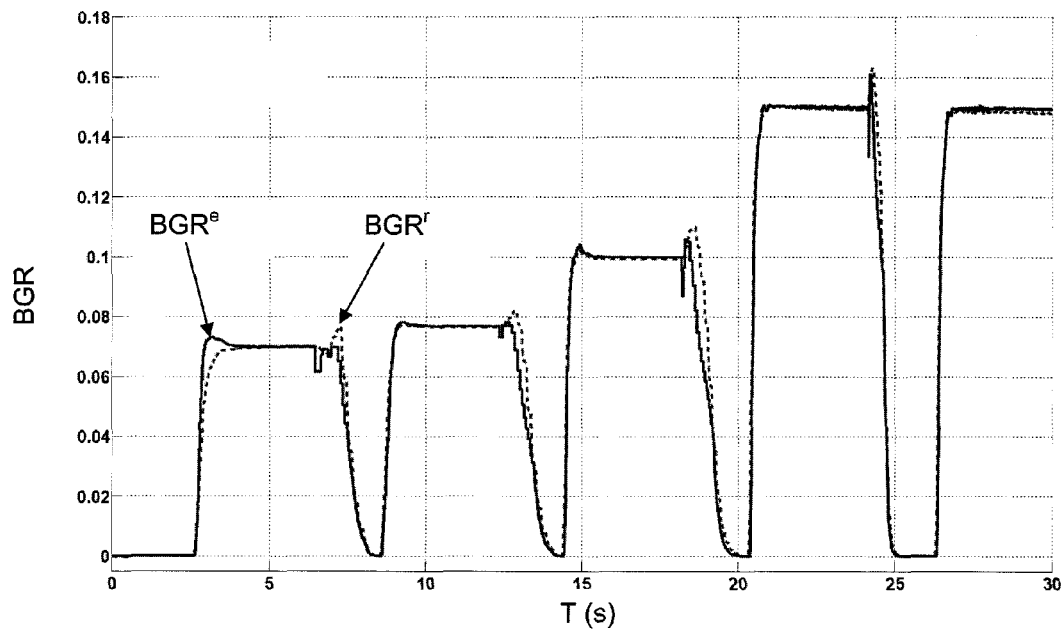
FIG. 2 illustrates a result of the estimation of the burnt gas mass fraction present in the mixture at the level of the intake manifold, using the method according to the invention.

FIG. 2 illustrates a result of the estimation of the burnt gas mass fraction present in the mixture at the level (point) of the intake manifold, using the method according to the invention. The working points considered cover a wide range: between 1000 rpm and 3000 rpm with increments of 500 rpm and, for each engine speed, the torque requirement is 20, then 220 Nm. The estimated BGR value ($BGR^e$) is shown as a full line and the measured real value ($BGR^r$) is shown as a dotted line. The ordinate axis gives the BGR value (estimated or measured) and the abscissa axis the time t in s.

3. Engine Control from the Estimated BGR

Estimation of the composition of the gas in the intake manifold then allows the combustion to be controlled. It is thus possible to control the ignition advance or the composition of the gas entering the cylinder.

i. Ignition Advance Control

In a combustion engine, combustion of the air/gasoline mixture usually starts after the spark. The flame front propagates and its blow drives part of the mixture against the cylinder walls and the piston top. The pressure and temperature rise become so significant that the fuel pressed against the walls reaches its auto-ignition point and ignites in several places. This phenomenon is referred to as "engine knock". Thus, engine knock is first and foremost an abnormal combustion phenomenon in spark-ignition engines, externally perceptible by a metallic noise coming from the engine. It results from the appearance of shock waves in the combustion chamber.

In order to prevent such a phenomenon, ignition is controlled as a function of the engine speed and the intake air mass to guarantee that no combustion will occur. Thus, conventionally, ignition advance control is written as follows:

$$AaA = f(Ne, M_{air})$$

where:
Function f is a static map.
AaA is the crank angle at which ignition has to be achieved
Mair is the air mass (fresh air and burnt gas).
Ne is the engine speed.

In cases where low-pressure EGR is used, the presence of burnt gas (thus neutral) allows the combustion to be slowed down and this abnormal combustion phenomenon to be avoided. Thus, we can re-optimize the ignition advance in order to improve the combustion efficiency. This re-optimization is based on the knowledge of the gas composition in the intake manifold, while adding a proportional term to the burnt gas mass fraction BGR(t) in the intake manifold. The advance control is thus rewritten as follows:

$$AaA = f(Ne, M_{air}) + g(Ne, M_{air})BGR$$

where function g is a static map.

Functions f and g are determined on the test bench in a known manner.

In this engine control strategy, the BGR estimation method is very important for controlling the combustion.

ii. Gas Composition Control

This thus allows the composition of the burnt gas in the cylinder to be controlled. The following stages are therefore carried out:

selecting a burnt gas fraction set point $BGR^{sp}$ in intake manifold (3);
estimating the burnt gas mass fraction BGR(t) present in the mixture at the level (point) of the intake manifold, according to stages 1 and 2;
calculating an opening set point $O^{sp}$ of EGR valve (6) allowing the difference between BGR(t) and $BGR^{sp}$ to be minimized; and
controlling the EGR valve (6) as a function of the opening the point of the EGR valve (6).

According to an embodiment, an opening set point $O^{sp}$ of EGR valve (6) is calculated with a proportional integral type controller. Applying opening set point $O^{sp}$ to the valve can be done using manual, hydraulic, pneumatic, electric, electronic or mechanical controls.

In this engine control strategy, the BGR estimation method is vital for controlling the composition of the gas so as to ensure smooth progress of the combustion.

The invention also relates to a combustion engine (1) comprising at least one cylinder (2), an intake manifold (3) and a burnt gas recirculation circuit comprising an EGR valve (6). The engine is provided with a pressure detector (5) at the level (point) of EGR valve (6) or with an air flow meter (5') at the starting point of the intake line. The engine also comprises control means (controllers, softwares) suited for applying the control method according to the invention.

The invention claimed is:

1. A method of controlling the combustion of a combustion engine comprising at least one cylinder, a turbocharger which includes a compressor, an intake circuit including an intake manifold and a burnt gas recirculation circuit including an EGR valve, comprising:

performing a measurement relative to fresh air or burnt gas flow rate, upstream from a mixing space wherein fresh air and burnt gas are mixed;

estimating a burnt gas mass fraction present in the mixing space from the measurement and a model of mixing dynamics in the mixing space wherein the mixing space has a volume beginning at the EGR valve and ending at the compressor, the model of mixing dynamics being expressed by an equation:

$$\frac{d}{dt}BGR_{bp}(t) = \frac{rT_{am}}{P_{atm}V_{bp}}(-[D_{gb}(t) + D_{air}(t)]BGR_{bp} + D_{gb}(t)),$$

wherein
$BGR_{bp}$ is the burnt gas mass fraction in a mixture of fresh air and burnt gas, at the EGR valve, $D_{gb}(t)$ is a mass flow rate of burnt gas fed through the EGR valve, $D_{air}(t)$ is fresh air mass flow rate at a intake line inlet, BGR is the burnt gas mass fraction in fresh air and burnt gas at the intake manifold which conditions burnt gas present in the cylinder upon closure of intake valve, $P_{atm}$ and $T_{atm}$ are atmospheric pressure and temperature, $T_{am}$ is an upstream temperature at an EGR valve inlet, and r is a specific ideal gas constant;

estimating a transport delay from the mixing space to the intake manifold expressed by an equation: $BGR(t) = BGR_{bp}(t - \tau(t))$, wherein T is time, $\tau$ is gas transport delay between a time of fresh air and burnt gas mixing and delivery at the manifold;

estimating in real time a burnt gas mass fraction in the intake manifold from the estimation of the burnt gas mass fraction present in the mixing space and the transport delay; and controlling the combustion from the real time estimation of the burnt gas mass fraction in the intake manifold.

2. A method as claimed in claim 1, wherein the model of the mixing dynamics in the mixing space is a function of an atmospheric pressure, of a temperature upstream from the EGR valve, of the mixing space of a mass flow rate of burnt gas fed through the EGR valve and of a fresh air mass flow rate at an inlet of the intake circuit.

3. A method as claimed in claim 1, wherein the transport delay is calculated by solving a laminar flow law iteratively over intake circuit zones defined so that thermodynamic conditions in each zone are homogeneous.

4. A method as claimed in claim 3, wherein the intake circuit zones are defined as three zones which are a first zone where the thermodynamic conditions correspond to the atmospheric conditions, a second zone where pressure and temperature increase during gas transport and a third zone where temperature decreases which is a last zone of the intake circuit.

5. A method as claimed in claim 1, wherein the measurement measures the fresh air mass flow rate at the inlet of the intake circuit.

6. A method as claimed in claim 1, wherein the measurement measures pressure at the EGR valve and the burnt gas mass fraction present in the space is estimated from a pressure difference and from a pressure drop relation applied at the EGR value.

7. A method as claimed in claim 1, wherein combustion control is achieved by controlling ignition advance by adding a proportional term to a burnt gas mass fraction in the intake manifold.

8. A method as claimed in claim 1, wherein combustion control is achieved by controlling an air mass contained in the at least one cylinder by controlling the EGR valve to minimize a difference between the burnt gas mass fraction and a burnt gas fraction set in the intake manifold.

9. A method as claimed in claim 2, wherein combustion control is achieved by controlling an air mass contained in the at least one cylinder by controlling the EGR valve to minimize a difference between the burnt gas mass fraction and a burnt gas fraction set in the intake manifold.

10. A method as claimed in claim 3, wherein combustion control is achieved by controlling an air mass contained in the at least one cylinder by controlling the EGR valve to minimize a difference between the burnt gas mass fraction and a burnt gas fraction set in the intake manifold.

11. A method as claimed in claim 4, wherein combustion control is achieved by controlling an air mass contained in the at least one cylinder by controlling the EGR valve to minimize a difference between the burnt gas mass fraction and a burnt gas fraction set in the intake manifold.

12. A method as claimed in claim 5, wherein combustion control is achieved by controlling an air mass contained in the at least one cylinder by controlling the EGR valve to minimize a difference between the burnt gas mass fraction and a burnt gas fraction set in the intake manifold.

13. A method as claimed in claim 6, wherein combustion control is achieved by controlling an air mass contained in the at least one cylinder by controlling the EGR valve to minimize a difference between the burnt gas mass fraction and a burnt gas fraction set in the intake manifold.

14. A method as claimed in claim 7, wherein combustion control is achieved by controlling an air mass contained in the at least one cylinder by controlling the EGR valve to minimize a difference between the burnt gas mass fraction and a burnt gas fraction set in the intake manifold.

15. A combustion engine comprising at least one cylinder, a turbocharger which includes a compressor, an intake manifold and a burnt gas recirculation circuit including an EGR value, a pressure detector associated with the EGR valve, or an air flow meter associated with a beginning of an intake line, and a controller for controlling the engine to perform the steps of:

performing a measurement relative to fresh air or burnt gas flow rate, upstream from a mixing space wherein fresh air and burnt gas are mixed;

estimating a burnt gas mass fraction present in the mixing space from the measurement and a model of mixing dynamics in the mixing space wherein the mixing space has a volume beginning at the EGR valve and ending at the compressor, the model of mixing dynamics being expressed by an equation:

$$\frac{d}{dt}BGR_{bp}(t) = \frac{rT_{am}}{P_{atm}V_{bp}}(-[D_{gb}(t) + D_{air}(t)]BGR_{bp} + D_{gb}(t)),$$

wherein $BGR_{bp}$ is the burnt gas mass fraction in a mixture of fresh air and burnt gas, at the EGR valve, $D_{gb}(t)$ is a mass flow rate of burnt gas fed through the EGR valve, $D_{air}(t)$ is fresh air mass flow rate at a intake line inlet, BGR is the burnt gas mass fraction in fresh air and burnt gas at the intake manifold which conditions burnt gas present in the cylinder upon closure of intake valve, $P_{atm}$ and $T_{atm}$ are atmospheric pressure and temperature, $T_{am}$ is an upstream temperature at an EGR valve inlet, and r is a specific ideal gas constant;

estimating a transport delay from the mixing space to the intake manifold expressed by an equation: $BGR(t)=BGR_{bp}(t-\tau(t))$, wherein T is time, $\tau$ is gas transport delay between a time of fresh air and burnt gas mixing and delivery at the manifold;

estimating in real time a burnt gas mass fraction in the intake manifold from the estimation of the burnt gas mass fraction present in the mixing space and the transport delay; and controlling the combustion from the real time estimation of the burnt gas mass fraction in the intake manifold.

* * * * *